(12) United States Patent
Katayama

(10) Patent No.: US 8,603,412 B2
(45) Date of Patent: Dec. 10, 2013

(54) MICROCHANNEL STRUCTURE, AND METHODS FOR PRODUCING EMULSION AND SOLID SPHERICAL PARTICLES

(75) Inventor: Hajime Katayama, Tokyo (JP)

(73) Assignees: Asahi Glass Company, Limited, Tokyo (JP); AGC Si-Tech Co., Ltd., Kitakyushu-shi (JP)

( * ) Notice: Subject to any disclaimer, the term of this patent is extended or adjusted under 35 U.S.C. 154(b) by 0 days.

(21) Appl. No.: 13/455,792

(22) Filed: Apr. 25, 2012

(65) Prior Publication Data

US 2012/0213686 A1    Aug. 23, 2012

Related U.S. Application Data

(63) Continuation of application No. PCT/JP2010/070232, filed on Nov. 12, 2010.

(30) Foreign Application Priority Data

Nov. 12, 2009  (JP) .................................. 2009-258570

(51) Int. Cl.
*G01N 15/06* (2006.01)

(52) U.S. Cl.
USPC ............ 422/503; 422/68.1; 422/81; 422/502; 422/504; 436/43; 436/180

(58) Field of Classification Search
USPC ............. 422/68.1, 81, 502, 503, 504; 436/43, 436/180
See application file for complete search history.

(56) References Cited

U.S. PATENT DOCUMENTS

2002/0043731 A1    4/2002    Nakajima et al.

FOREIGN PATENT DOCUMENTS

| JP | 53-121222 | 10/1978 |
|---|---|---|
| JP | 2002-119841 | 4/2002 |
| JP | 2004-268029 | 9/2004 |
| JP | 2007-98237 | 4/2007 |
| JP | 4193626 | 10/2008 |
| JP | 2009-226503 | 10/2009 |

OTHER PUBLICATIONS

International Search Report issued Jan. 25, 2011 in PCT/JP2010/070232 filed Nov. 12, 2010.

*Primary Examiner* — Brian J Sines
(74) *Attorney, Agent, or Firm* — Oblon, Spivak, McClelland, Maier & Neustadt, L.L.P.

(57) ABSTRACT

A microchannel structure is provided wherein supplied fluids are prevented from transuding via a lamination interface into channels for a mixture or reaction product. A method is further provided for producing an emulsion having a uniform particle size under a high pressure condition by using the microchannel structure. The microchannel structure comprises one or more layers having notches to constitute channels, laminated and pressed between a pair of frames having an outside communicating hole to constitute a channel, so as to form microchannels to mix/react fluids, channels to supply the fluids to the microchannels, and a channel to discharge the fluids from the microchannels, wherein a channel for discharging a transudation fluid is provided to recover a fluid having transuded at a lamination interface so as not to let it enter into the channels including the microchannels and discharge it to the outside.

11 Claims, 4 Drawing Sheets

MICROCHANNEL STRUCTURE, AND METHODS FOR PRODUCING EMULSION AND SOLID SPHERICAL PARTICLES

TECHNICAL FIELD

The present invention relates to a microchannel structure represented by e.g. a laminate-type micromixer or a laminate-type microreactor, a method for producing an emulsion by means thereof, as well as a method for producing solid spherical particles by using the emulsion thereby obtained.

BACKGROUND ART

In recent years, developments have been actively conducted for a typical apparatus (such as a micromixer or a microreactor) to carry out mixing, emulsifying, a chemical reaction, an analysis, etc. of various solutions, etc. by utilizing the characteristics of microchannels. For example, a laminate-structured micromixer has been proposed in order to form a fine three dimensional channel structure or to increase microchannels thereby to improve the productivity (Patent Documents 1 and 2).

Further, in the case of a microreactor to carry out a chemical reaction in microchannels, in order to increase the productivity of the apparatus, it is required to elongate microchannels to prolong the retention time or to supply the raw material in a larger amount. In either case, the pressure to be exerted in the apparatus becomes high.

On the other hand, in the case of a micromixer to carry out mixing or emulsification in microchannels, in order to carry out the mixing or emulsification more quickly and uniformly, it is required to reduce the size of microchannels thereby to increase the linear velocity or to let the fluid flow through a complicatedly-shaped portion, and either case also leads to an increase of the operation pressure.

In an apparatus utilizing such microchannels, the uniformity in the reaction conditions such as the temperature, time, etc., the high proportion of contact area, and the laminar flow state, which are specific to microchannels, are utilized. Therefore, if the fluid moves in a lamination interface i.e. not in the microchannels in which the fluid is expected to flow, such means that the reaction cannot be carried out as designed. Especially, in the case of a micromixer to carry out uniform emulsification through micropores, it is required to reduce also the size of the micropores in order to obtain a more fine emulsion, and also in such an application, it is unavoidable that the operation pressure becomes high. In an apparatus designed for uniform emulsification, if a dispersion having transuded at a lamination interface, transudes into a channel for a mixture (emulsion), an emulsion having a particle size other than the desired particle size will be formed, whereby the desired product may not be obtained, and therefore, it is absolutely necessary to avoid such a phenomenon of transudation of the dispersion.

Further, in a micromixer or microreactor having a channel which is internally divided into a plurality of microchannels, if a fluid having a different viscosity, having transuded at a lamination interface, flows into a part of the channel, the flow tends to be nonuniform, whereby the desired product may not be obtained, and also from such a viewpoint, it is absolutely necessary to avoid such a phenomenon that the fluid having transuded at a lamination interface flows into an upstream channel than the microchannels.

In a laminate-type micromixer, a method has been proposed to carry out sealing by packing a soft material to prevent leakage into a lamination interface. Such leakage into a lamination interface is likely to occur as the internal pressure in operation is high, and therefore, it has been proposed to design the pressure to be lower so that no leakage will practically occur or to dispose microchannels by a design not to permit inclusion of a leaked fluid into the product channel even if leakage occurs.

A method has also been proposed to bond the laminated surfaces for integration, but with a view to cleaning the interior of the apparatus or change of the reagent to be used or the internal structure depending upon the particular purpose, a micromixer which can be designed and assembled depending upon the application is preferred, rather than bonding the laminated surfaces (Patent Document 3).

Further, in consideration of repeated use by cleaning many times, it is expected that the sealing may be deteriorated by scratches or deposited dusts between the laminated surfaces, and it is also desired to improve the reliability of such a portion.

PRIOR ART DOCUMENTS

Patent Documents

Patent Document 1: JP-A-2004-268029
Patent Document 2: Japanese Patent No. 4,193,626
Patent Document 3: JP-A-2009-226503

DISCLOSURE OF INVENTION

Technical Problem

It is an object of the present invention to provide a microchannel structure such as a laminate-type micromixer or a laminate-type microreactor, wherein supplied fluids are prevented from transuding via an interface between laminated surfaces into a channel for a mixture or reaction product. Further, it is another object of the present invention to provide a method for producing an emulsion by means of the microchannel structure such as a laminate-type micromixer, in order to produce an emulsion having a uniform particle size under a high pressure condition, and further, a method for producing solid spherical particles having a uniform particle size, from such an emulsion.

Solution to Problem

The microchannel structure of the present invention comprises one or more layers having notches to constitute channels including microchannels, laminated and pressed between a pair of frames having an outside communicating hole to constitute a channel in at least one of them, so as to form one or more microchannels to mix two or more fluids, to mix and react two or more fluids or to react one or more fluids, channels to supply the fluids to the microchannels, and a channel to discharge the fluids from the microchannels, wherein at least one of the frames has an outside communicating hole to constitute a channel for discharging a transudation fluid, to recover a fluid having transuded at a lamination interface so as not to let it enter into the channels including the microchannels and discharge it to the outside, and said one or more layers may contain a notch to constitute a channel for discharging the transudation fluid.

Here, in this specification, "a microchannel" means a fine channel, of which the short side of the cross-sectional shape is from about 0.01 to 1 mm. As mentioned above, in the microchannel structure of the present invention, the channel to mix or react the fluids is a microchannel. Other channels, specifically, the fluid-supplying channel, the channel to discharge fluids such as the mixture, reaction product, etc. and the channel for discharging the transudation fluid, are not limited in their sizes, so long as they can let the fluids flow therethrough, and they may or may not be microchannels. In this specification, "a channel" is used as including a microchannel.

Further, in the microchannel structure of the present invention, in the case of laminating and pressing the above-mentioned one layer between the pair of the frames, lamination means lamination of both frames and said layer. Further, even in a case where a plurality of layers are laminated, the term "lamination interface" includes not only a lamination interface between the respective layers but also a lamination interface between each frame and the adjacent layer.

Further, the present invention provides a method for producing an emulsion by means of the above microchannel structure of the present invention.

The present invention also provides a method for producing solid spherical particles by using an emulsion obtained by the above method of the present invention.

Advantageous Effects Of Invention

When the microchannel structure of the present invention is adopted, a fluid having transuded at a lamination interface can be prevented from entering into the channels for the mixture or reaction product, whereby a highly reliable operation becomes possible. Further, when the microchannel structure of the present invention is employed especially for the production of an emulsion for the purpose of uniform emulsification, it becomes possible to obtain an emulsion having a uniform particle size under a high pressure condition, and it is further possible to obtain solid spherical particles having a uniform particle size.

DESCRIPTION OF EMBODIMENTS

Figure 1:
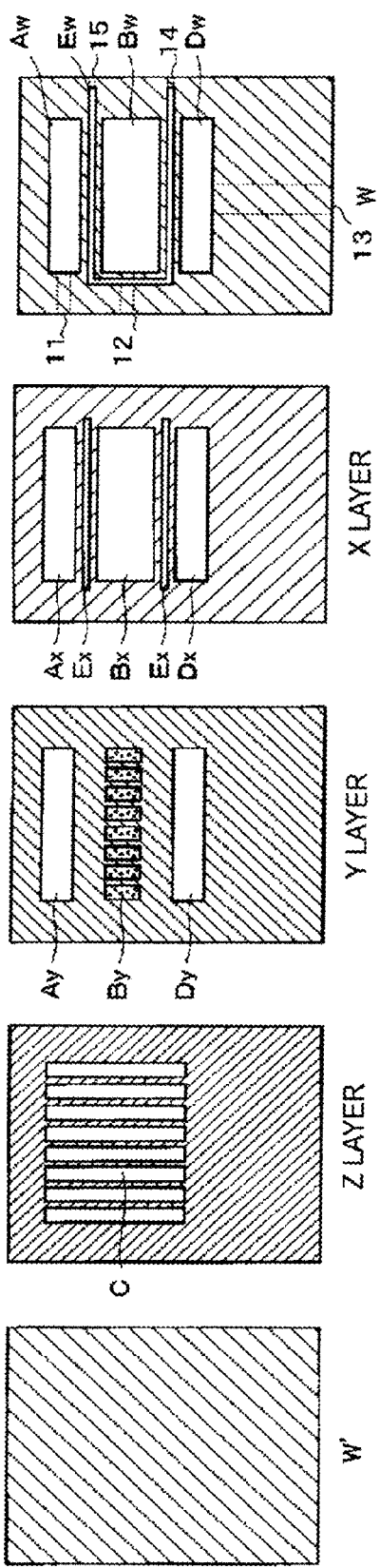
FIG. 1 is a plan view of the respective layers to constitute a microchannel structure (laminate-type micromixer) for the production of an emulsion in one embodiment of the present invention.

The microchannel structure of the present invention is a microchannel structure comprising one or more layers having notches to constitute channels including microchannels, laminated and pressed between a pair of frames having an outside communicating hole to constitute a channel in at least one of them, so as to form one or more microchannels to mix two or more fluids, to mix and react two or more fluids or to react one or more fluids, channels to supply the fluids to the microchannels, and a channel to discharge the fluids from the microchannels, wherein in order to prevent a fluid flowing in a certain channel e.g. a raw material fluid-supplying channel from moving, via a lamination interface, to another channel e.g. a channel for supplying another raw material fluid or a channel for the mixture or reaction product, at least one of the frames has an outside communicating hole to constitute a channel for discharging a transudation fluid, to recover a fluid having transuded at a lamination interface so as not to let it enter into the channels including the microchannels and discharge it to the outside, and said one or more layers may contain a notch to constitute a channel for discharging the transudation fluid.

The above transudation fluid-discharging hole is preferably formed at a portion where the fluid at the lamination interface will move to, so that it will not intersect with the above-mentioned plurality of channels and it will have a pressure lower than the channel from which leakage is desired to be prevented, and it has such a structure that the fluid having transuded at a lamination interface is discharged through the transudation fluid-discharging hole to the outside of the apparatus.

Specifically, the microchannel structure of the present invention preferably has such a structure that the following Y and Z layers, or the following Y, Z and Y' layers, having notches to constitute channels, are sequentially laminated and pressed between the pair of frames; and at least one of the frames is provided with fluid-supplying holes to supply fluids, a mixture/reaction product-discharging hole to discharge a mixture or reaction product, and a transudation fluid-discharging hole to recover a fluid having transuded at a lamination interface so as not to let it enter into the channels including the microchannels and discharge it from the transudation fluid-discharging hole to the outside:

Y and Y' layers: both have the following (b), and one or both have the following (a) and/or (c), (a) a first notch communicated with the microchannels and a first fluid-supplying hole, to supply a first fluid from the first fluid-supplying hole to the microchannels at an upstream side of the microchannels formed in the following Z layer, (b) second notches for at least one second fluid, communicated with the microchannels and a fluid-supplying hole for the second fluid, to supply the second fluid from the second fluid-supplying hole to a downstream side, than the first notch, of the microchannels, (c) a third notch communicated with the mixture/reaction product-discharging hole and the microchannels, to discharge a mixture or reaction product of the first and second fluids from a downstream side, than the second notches, of the microchannels, Z layer: a layer having notches to constitute microchannels to mix or to mix and react the first and second fluids between the Y and Y' layers.

Further, the laminate-type micromixer of the present invention preferably has such a structure that it has the following X layer and/or the following X' layer on a surface, on the side not to face the Z layer, of the Y layer and/or the Y' layer:

X and X' layers: both have the following (e) and (f), and one or both have the following (d) and/or (g), as X layer corresponds to notches of the Y layer and X' layer corresponds to notches of the Y' layer, (d) a first notch to constitute a channel for the first fluid, communicated with the first fluid-supplying hole and the first notch of the Y or Y' layer, to supply the first fluid from the first fluid-supplying hole to the first notch of the Y or Y' layer, (e) a second notch to constitute a channel for the second fluid, communicated with the second fluid-supplying hole for at least one second fluid and the second notches of the Y or Y' layer, to supply the second fluid to the downstream side than the first notch, (f) a fourth notch to constitute a channel for the transudation fluid, communicated with the transudation fluid-discharging hole formed in at least one of the above frames, (g) a third notch to constitute a channel for the mixture or reaction product, communicated with the mixture/reaction product-discharging hole and the third notch of the Y or Y' layer, to discharge the mixture or reaction product of the first and second fluids.

Further, the transudation fluid-discharging hole being the outside communicating hole to constitute a channel for discharging the transudation fluid, is preferably provided along at least a part of the periphery, in the laminated plane, of the channels to supply the fluids, in order to recover a fluid having transuded at a lamination interface so as not to let it enter into the microchannels, the fluid-supplying channel, the mixture/reaction product-discharging channel, etc., and discharge it to the outside.

Here, the microchannel structure of the present invention may be used specifically as a laminate-type micromixer for mixing two or more fluids or a laminate-type microreactor for mixing and reacting two or more fluids or for reacting one or more fluids, in the above-mentioned microchannels.

In a case where it is used as a laminate-type micromixer for mixing two or more fluids, the objective mixing of fluids is not particularly limited, but specifically, a case may be mentioned wherein a disperse phase and a continuous phase are mixed as the supplied fluids in the apparatus to carry out emulsification to produce an emulsion.

Whereas, in the case of the laminate-type microreactor for mixing and reacting two or more fluids or for reacting one or more fluids, the reaction is not particularly limited, and may, for example, be various reactions such as a catalytic reaction, an ion-exchange reaction, an electrochemical reaction, a radical reaction, a supercritical reaction, etc.

Among them, the microchannel structure of the present invention is more preferably used for the production of an emulsion, as a laminate-type micromixer.

Further, it may be more preferably used for the production of uniform solid spherical particles by using, as a raw material for the above emulsion, a material which can be solidified by a subsequent treatment.

Now, with respect to an embodiment of the present invention, an example of the microchannel structure (laminate-type micromixer) will be described with reference to FIGS. 1 to 5 wherein a disperse phase as a second fluid is ejected into a continuous phase (first fluid) through micropores thereby to carry out uniform emulsification (mixing). However, the present invention is a microchannel structure including a laminate-type micromixer and a laminate-type microreactor capable of discharging a fluid having transuded from a lamination interface to the outside, before it reaches channels such as the microchannels, the fluid-supplying channel, the mixture/reaction product-discharging channel, etc., and it is by no means limited to the microchannel structure (laminate-type micromixer) for the production of an emulsion as an embodiment, as described below.

Figure 2:
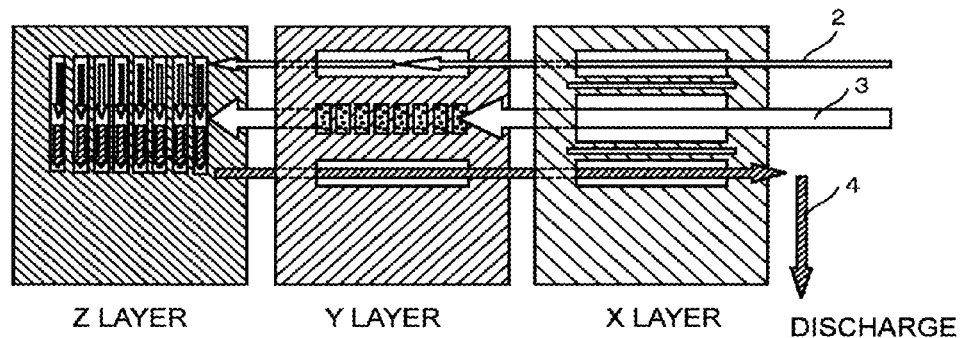
FIG. 2 is a view illustrating the flow of fluids flowing in a microchannel structure (laminate-type micromixer) for the production of an emulsion in one embodiment of the present invention.
Figure 3:
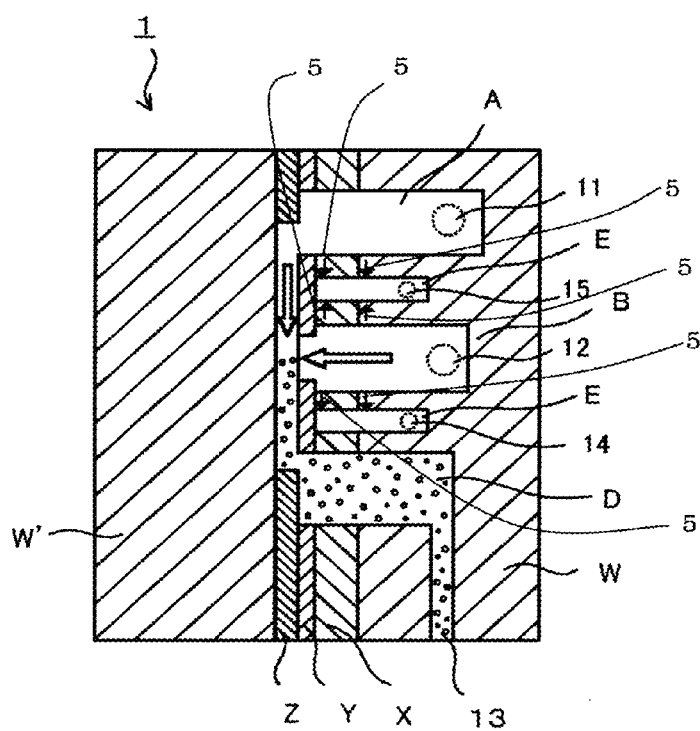
FIG. 3 is a cross-sectional view of a microchannel structure (laminate-type micromixer) for the production of an emulsion in one embodiment of the present invention.
Figure 4:
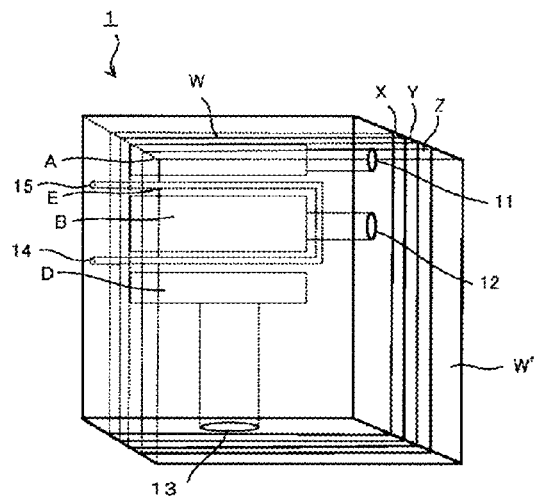
FIG. 4 is a perspective view of a microchannel structure (laminate-type micromixer) for the production of an emulsion in one embodiment of the present invention.
Figure 5:
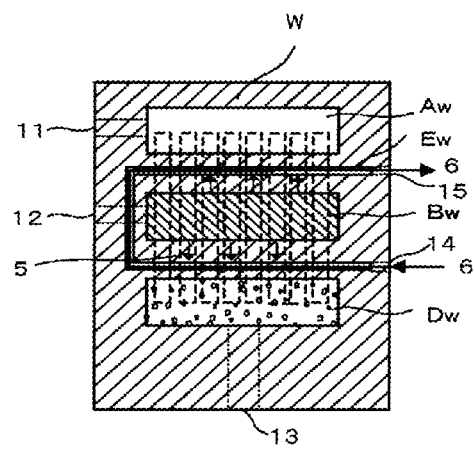
FIG. 5 is a plan view of the front frame of a microchannel structure (laminate-type micromixer) for the production of an emulsion in one embodiment of the present invention.

The structures of the respective layers to constitute a microchannel structure (laminate-type micromixer) for the production of an emulsion as one embodiment of the present invention (hereinafter referred to as "the laminate-type micromixer in the first embodiment of the present invention") are shown in FIG. 1 in a plan view. FIG. 2 is a view illustrating the flow of fluids flowing in the respective layers in the laminate-type micromixer in the first embodiment of the present invention. FIG. 3 is a cross-sectional view illustrating the structure of the laminate-type micromixer in the first embodiment of the present invention, and FIG. 4 is its perspective view. FIG. 5 is a plan view of the front frame of the laminate-type micromixer in the first embodiment of the present invention.

Thus, the microchannel structure in the first embodiment of the present invention may be classified in a laminate-type micromixer for producing an emulsion by mixing two or more fluids. Therefore, in the following description of the laminate-type micromixer in the first embodiment of the present invention, "the mixture/reaction product-discharging hole" in the microchannel structure of the present invention is represented by "the mixture-discharging hole" or "the emulsion-discharging hole", and "the channel for the mixture or reaction product" is represented by "the mixture channel" or "the emulsion-discharging hole".

As shown in FIGS. 3 and 4, in the laminate-type micromixer 1 in the first embodiment, between a pair of frames constituted by a front frame W and a rear frame W', X, Y and Z layers are laminated and pressed sequentially from the front frame W side towards the rear frame W' side. A means to laminate and press the respective layers between the front frame W and the rear frame W' is not shown in the drawings, but in the present invention, a method for lamination and pressing commonly employed at the time of preparing a laminate-type micromixer or a laminate-type microreactor, may be used without any particular restriction. Specifically, a method of providing a plurality of screw holes for fixing inside of outer edges of the respective frames and layers and laminating and pressing the respective layers between both frames by means of screws, or a method of pressing the laminate by applying a pressure from both sides of the laminate, may be mentioned. In FIGS. 3 and 4, "→" represents the transudation fluid 5.

Here, in the laminate-type micromixer 1 in the first embodiment of the present invention, the front and rear frames W and W' and the respective layers i.e. X, Y and Z layers laminated between them, are, respectively, provided with holes to constitute channels for at least two fluids. In FIGS. 1 to 5, a channel for the first fluid (continuous phase) is shown by A, a channel for the second fluid (disperse phase) is shown by B, microchannels to mix the first and second fluids is shown by C, a channel for the mixture (emulsion) of the first and second fluids is shown by D, and a channel for the transudation fluid having transuded at a lamination interface is shown by E.

Firstly, the front and rear frames W and W' to laminate and press the respective layers will be described. As shown in FIGS. 1 and 3 to 5, in the laminate-type micromixer 1 in the first embodiment of the present invention, the front frame W has a structure provided with a fluid-supplying hole Aw for the continuous phase being the first fluid at the upstream side of the microchannels formed in the Z layer which will be described later, a fluid-supplying hole Bw for the disperse phase being the second fluid at the downstream side than the fluid-supplying hole Aw for the first fluid (continuous phase), a discharging hole Dw for an emulsion being the mixture at the downstream side than the fluid-supplying hole Bw of this disperse phase, and a transudation fluid-discharging hole Ew formed to enclose three sides of the fluid-supplying hole Bw for the disperse phase, facing the X layer.

Here, the respective holes in the front frame W are communicated with the outside of the front frame W. That is, the fluid-supplying hole Aw for the continuous phase is communicated with the outside of the front frame W by a continuous phase (first fluid) inlet 11, the fluid-supplying hole Bw for the disperse phase is so communicated by a disperse phase (second fluid) inlet 12, the discharging hole Dw for the emulsion is so communicated by an emulsion (mixture) outlet 13, and the transudation fluid-discharging hole Ew is so communicated by two outside communicating ports 14 and 15. Such fluid inlets and outlets are formed on the side surface of the front frame W in the laminate-type micromixer 1 in the first embodiment, but they may be formed on the surface on the side opposite to the surface facing the X layer.

The size of the above front frame W is suitably adjusted depending upon e.g. the type of the mixture (emulsion) to be obtained by using the laminate-type micromixer, the required length of microchannels, the number of channels, the installation site, etc.

The material for the front frame and the following rear frame is not particularly limited so long as it is a material not reactive with the fluids to be used or the mixture and it has sufficient processability whereby the above-mentioned various holes can be processed into desired shapes and mechanical strength such as heat resistance, pressure resistance, etc. durable under conditions of the pressure, temperature, etc. required for mixing the fluids. Specifically, it may, for example, be a metal such as nickel, SUS or silicon, glass, or a resin material such as an acrylic resin, an aromatic polyester resin, a polyphenylene sulfide resin, a polyether ether ketone resin, a polyimide resin or a fluororesin.

In the laminate-type micromixer 1 in the first embodiment of the present invention, the rear frame W' has a flat surface as the surface facing the Z layer and does not have an outside communicating hole to constitute a channel.

The size of the rear frame W' may be the same as the above-described front frame W. Here, in the laminate-type micromixer in the first embodiment of the present invention, it is possible to adopt a structure wherein the rear frame W', X' layer and Y' layer having substantially the same structures as the front frame W, X layer and Y layer are disposed symmetrically with respect to the Z layer as the center plane.

Now, the respective layers of the X, Y and Z layers laminated and pressed between the front and rear frames W and W' in the laminate-type micromixer 1 in the first embodiment of the present invention, will be described with reference to FIGS. 1 to 3.

In the laminate-type micromixer 1 in the first embodiment of the present invention, the X layer formed inside of the front frame W is usually provided to serve as a gasket to suppress leakage of supplied fluids to a lamination interface. Further, in a case where X' layer is formed, it is likewise provided for the purpose of serving as a gasket. To obtain the essential structure in the microchannel structure of the present invention, such X and X' layers are not essential constituting elements but optional constituting elements to be provided as the case requires. Accordingly, even a laminate-type micromixer of a structure having no X layer, is also within the scope of the laminate-type micromixer of the present invention, so long as it is within such a range that in the laminate-type micromixer 1 in the first embodiment of the present invention, the laminated structure of the Y and Z layers is laminated and pressed between the front and rear frames W and W', and the respective layers and the frames are sufficiently sealed, so that the effects of the present invention are not impaired.

However, in the laminate-type micromixer 1 in the first embodiment of the present invention, the Y layer which will be described hereinafter is preferably made of a hard material from its structure, and accordingly, the X layer is usually used as a gasket to reduce the transudation fluid. The X layer is not particularly limited so long as it is made of a material capable of performing the function as a gasket, but is preferably made of a soft material having a cushioning nature, specifically a soft resin such as a silicon resin or a fluororesin, or a rubber.

In the laminate-type micromixer 1 in the first embodiment of the present invention, as shown in FIGS. 1 to 3, the X layer has a first notch Ax communicated with the fluid-supplying hole Aw for the continuous phase in the front frame W and the first notch Ay in the Y layer, in order to supply the continuous phase from the fluid-supplying hole Aw for the continuous phase in the front frame W to the first notch Ay in the Y layer which will be described below. The first notch Ax to constitute a channel for the continuous phase in the X layer, is preferably made to have substantially the same size as the fluid-supplying hole Aw for the continuous phase in the front frame W.

Further, the X layer has a second notch Bx communicated with the fluid-supplying hole Bw for the disperse phase in the front frame W and the second notch By in the Y layer, in order to supply the disperse phase from the fluid-supplying hole Bw for the disperse phase in the front frame W to the second notch By in the Y layer. The second notch Bx to constitute a channel for the disperse phase in the X layer, is preferably made to have substantially the same size as the fluid-supplying hole Bw for the disperse phase in the front frame W.

The X layer has a third notch Dx communicated with the emulsion-discharging hole Dw in the front frame W to discharge the mixture (emulsion) of the continuous phase and the disperse phase and the third notch Dy in the Y layer.

Further, the X layer has a fourth notch Ex communicated with the transudation fluid-discharging hole Ew in the front frame W and facing the Y layer, which will be described below. The fourth notch Ex to constitute a channel for the transudation fluid in the X layer corresponds substantially to the transudation fluid-discharging hole Ew in the front frame W, but in the X layer, two notches are formed above and below the second notch Bx to constitute channels for the transudation fluid. This may be formed in the same ⊐ shape as the shape of the transudation fluid-discharging hole Ew in the front frame W, but since the X layer is made of a soft material and the layer thickness is thin, the fourth notch Ex should better be not integrated but provided dividedly from the viewpoint of the handling efficiency.

The size of the X layer is usually made to be the same as the front frame W and the rear frame W'. The thickness is not particularly limited so long as it is a thickness functioning as a gasket, and it is usually preferably from 0.05 to 3 mm, more preferably from 0.1 to 0.5 mm.

In the laminate-type micromixer 1 in the first embodiment of the present invention, the Y layer is a layer having the following notches to constitute channels for supplying the continuous phase as the first fluid and the disperse phase as the second fluid from the front frame W via the X layer to microchannels C formed in the after-described Z layer between the Y layer and the rear fame W', and notches to constitute a channel for discharging a mixture (emulsion) mixed in the microchannels formed in the Z layer to the front frame W via the X layer. In the laminate-type micromixer 1 in the first embodiment of the present invention, the notches to supply the disperse phase are constituted by a plurality of micropores to form an emulsion.

Specifically, in the laminate-type micromixer 1 in the first embodiment of the present invention, as shown in FIGS. 1 to 3, the Y layer has a first notch Ay communicated with the first notch Ax in the X layer and the microchannels C formed in the Z layer, in order to supply the continuous phase supplied via the first notch Ax in the X layer from the fluid-supplying hole Aw for the continuous phase in the front frame W to the upstream side of the microchannels C formed in the after-described Z layer.

Further, the Y layer has second notches By communicated with the second notch Bx in the X layer and the microchannels C formed in the Z layer, in order to supply the disperse phase supplied via the second notch Bx in the X layer from the fluid-supplying hole Bw for the disperse phase in the front frame W to the downstream side, than the first notch By, of the microchannels C formed in the after-described Z layer. In the laminate-type micromixer 1, the second notches By in the Y layer are provided to correspond with the microchannels C formed in the Z layer between the Y layer and the rear frame W', in order to supply the disperse phase to the microchannels C.

That is, since the microchannels C can be made to be a plurality of microchannels as described hereinafter, the second notches By in the Y layer are provided in the same number corresponding to the number of such microchannels. Further, the second notches By to constitute a channel for supplying the disperse phase to the microchannels C are provided in the Y layer as an assembly of a plurality of micropores. In the microchannels C, the continuous phase already supplied via the first notch Ay for supplying the continuous phase provided on the upstream side of the Y layer, flows. Into such a continuous phase, the disperse phase is supplied via the second notches By being an assembly of a plurality of micropores in the Y layer, whereby an emulsion having the disperse phase dispersed in the continuous phase, is formed.

As mentioned above, the second notches By in the Y layer are preferably in the same number as the number of the after-described microchannels C. The size and shape of the micropores depend on the type and particle size of the emulsion to be produced. The particle size of the emulsion depends also on the thickness of the Z layer, the types and supplying rates of the continuous phase and the disperse phase, the concentration of an emulsifier, etc. Further, to the micropores, by a conventional method, water repellent treatment may be applied in a case where the disperse phase is a hydrophilic fluid, or hydrophilic treatment may be applied in a case where the disperse phase is a lipophilic fluid. Further, similar treatment may be applied to the frames and the respective layers to constitute the laminate-type micromixer, as the case requires.

Further, the Y layer has a third notch Dy communicated with the microchannels C and the emulsion-discharging hole Dw in the front frame W via the third notch Dx in the X layer, in order to discharge the emulsion obtained in the microchannels C, at the downstream side than the above second notches By.

The material to constitute the Y layer is not particularly limited so long as it is a material capable of forming the above-mentioned micropores in the following thickness and durable for ejection of the disperse phase under a pressure of at least a certain level. Specifically, a metal such as stainless steel, nickel or silicon, glass, or a resin material such as an acrylic resin, an aromatic polyester resin, a polyphenylene sulfide resin, a polyether ether ketone resin, a polyimide resin or a fluororesin may, for example, be used. However, a hard metal is preferably used.

Further, the size of the Y layer is usually the same as the front frame W and the rear frame W'. The thickness is not particularly limited so long as it is a thickness whereby the disperse phase can be uniformly supplied from the micropores in the Y layer to the microchannels C, but it is preferably from about 0.005 to 5 mm, more preferably from 0.03 to 0.5 mm.

In the laminate-type micromixer 1 in the first embodiment of the present invention, the Z layer is a layer having notches for forming microchannels C between the above Y layer and the rear frame W'.

With respect to the microchannels C formed in the Z layer between the Y layer and the rear frame W' by the notches of the Z layer, the number of such microchannels shown in FIGS. 1 to 3 is eight, but the number of microchannels is not particularly limited and may be one or more. The shape of the microchannels C is not particularly limited, but is preferably a rectangular shape.

In the laminate-type micromixer 1, the thickness of the Z layer i.e. the depth of the microchannels is preferably from 0.01 to 1 mm, more preferably from 0.03 to 0.5 mm. The size of the Z layer may be the same size as the frames and the respective layers other than the Z layer.

Further, in the microchannel structure of the present invention, the size, the number, the shape, etc. of the microchannels are suitably selected in consideration of e.g. the type of the reaction or mixing to be applied, the types of the fluids to be used, the heat removal ability, etc.

The material to constitute the Z layer is not particularly limited so long as it is a material capable of forming the above microchannels C in the above thickness and durable against the temperature, the pressure and the reagents to be used. Specifically, a metal such as stainless steel, nickel or silicon, glass, or a resin such as a polyphenylene sulfide resin, a polyether ether ketone resin, a polyimide resin or a fluororesin may, for example, be preferably used.

In the microchannels C, to the upstream side of all microchannels, the continuous phase is supplied, which was supplied from the fluid-supplying hole Aw for the continuous phase in the front frame W via the first notch Ax in the X layer and the first notch Ay (continuous phase channel A) in the Y layer. The supply of the continuous phase to the laminate-type micromixer is carried out from the fluid inlet 11 for the continuous phase in the front frame W by a usually supplying means (not shown), specifically by e.g. pumping or pressure feeding. The feeding pressure may depend on e.g. the type of the continuous phase, the physical properties of the desired product, etc., but it is usually preferably from 0.001 to 1 MPa, more preferably from 0.005 to 0.5 MPa.

In the microchannels C, the disperse phase is supplied into the continuous phase at the downstream side of the junction with the notch Ay for supplying the continuous phase. The disperse phase is supplied into the continuous phase flowing in all of the microchannels C from the Y layer side, by flowing from the fluid-supplying hole Bw for the disperse phase in the front frame W via the second notch Bx in the X layer and the second notches By i.e. a plurality of micropores (disperse channel B) in the Y layer.

Here, in the laminate-type micromixer in the first embodiment of the present invention, as mentioned above, it is possible to adopt a structure wherein a rear frame W', X' layer and Y' layer having the same structures as the front frame W, X layer and Y layer may be symmetrically disposed with respect to the Z layer as the center plane. In a case where such rear frame W', X' layer and Y' layer are used, if their constituting elements are described by using symbols having "'" attached to the symbols of the constituting elements of the corresponding front frame W, X layer and Y layer, the disperse phase is supplied into the continuous phase flowing in all of the microchannels C from the Y' layer side, by flowing from the fluid-supplying hole Bw' for the disperse phase in the rear frame W' via the second notch Bx' in the X' layer and the second notches By' i.e. a plurality of micropores (disperse phase channel B) in the Y' layer.

In such a case, to the microchannels C, the disperse phase is supplied from each of the Y layer side and the Y' layer side, whereby the concentration of the disperse phase in the microchannels C can be made to be twice as compared with the case where the disperse phase is supplied only from the above Y layer side (i.e. only from one side). The supply of the disperse phase to the laminate-type micromixer is carried out from the fluid inlet 12 for the disperse phase in the front frame W by a usual supplying means (not shown), specifically by e.g. pumping or pressure feeding. The feeding pressure may depend on the type of the disperse phase, the physical properties of the desired product, etc., but it is usually preferably from 0.001 to 1 MPa, more preferably from 0.005 to 0.5 MPa.

In the microchannels C, in all of the microchannels, the disperse phase is ejected into the continuous phase, whereby an emulsion is formed. The emulsion produced in the microchannels C is discharged to the outside of the laminate-type micromixer from an emulsion outlet 13 in the front frame W, by flowing from the third notch Dy in the Y layer via the third notch Dx in the X layer to the emulsion-discharging hole Dw (emulsion channel D) in the front frame W.

In the laminate-type micromixer 1 in the first embodiment of the present invention, as described above, a fluid to constitute a disperse phase is supplied into the laminate-type micromixer, whereupon it not only flows in the disperse phase channel B (a channel from the fluid-supplying hole Bw for the disperse phase in the front frame W via the second notch Bx in the X layer to the second notches By i.e. a plurality of micropores in the Y layer), but also may transude into the respective lamination interfaces, specifically into an interface between the X and Y layers, or between the X layer and the front frame W (in this embodiment, an interface between the Z and Y layers does not apply, but an interface between the Z and Y layers may apply depending upon the manner of the disposition of channels). Likewise, also a fluid to constitute a continuous phase may transude into the same lamination interfaces as described above, but in a case where the transudation amount of the continuous phase is small as compared with the entire amount, such may not present a substantial influence over other than the concentration of the emulsion.

The laminate-type micromixer 1 in the first embodiment of the present invention is characterized in that rather than preventing the fluid (such as the disperse phase or the continuous phase) from transuding into lamination interfaces, the fluid having transuded is prevented from entering into other channels A, B and D by providing the channel E for the transudation fluid separately from the continuous phase channel A, the disperse phase channel B and the emulsion channel D.

Specifically, in the laminate-type micromixer 1 in the first embodiment of the present invention, as shown in FIGS. 1 to 5, for the channel E for the transudation fluid, two fourth notches Ex are formed above and below the second notch Bx to constitute the disperse phase channels in the X layer, and, as communicated therewith, the transudation fluid-discharging hole Ew is formed in the front frame W to enclose three sides of the fluid-supplying hole Bw for the disperse phase in the front frame W to face the X layer thereby to form the channel E for the transudation fluid.

Here, the transudation fluid-discharging hole Ew in the front frame W is communicated with the outside of the front frame W via two outside communicating ports 14 and 15. The transudation fluid channel E may be made so that the fluids (the disperse phase and the continuous phase in this embodiment) having transuded under the atmospheric pressure are naturally discharged to the outside of the laminate-type micromixer 1, or a fluid free from a problem even if included in a product, e.g. the continuous phase, may be permitted to flow together with a carrier fluid at such a flow rate as to be under a low pressure, specifically by supplying a carrier fluid from the outside communicating port 14 by a supplying means such as a pump (not shown) and discharging it from an outside communicating port 15 thereby to positively discharge it to the outside. Especially in a case where the fluid to be used is a fluid which is likely to be readily solidified or a fluid having a high viscosity, it is preferred to supply a carrier fluid and positively discharge it to the outside.

Such a carrier fluid is a fluid which emulsifies the transudation fluid or is mixed therewith to lower the viscosity than the viscosity of the transudation fluid. The carrier fluid is preferably of the same type as the continuous phase to be used for emulsification. The cross-sectional area of the transudation fluid channel is preferably at least the cross-sectional area of a microchannel, more preferably at least 1 mm$^2$.

In the laminate-type micromixer in the first embodiment of the present invention, a layer having notches to constitute e.g. the continuous phase channel, the disperse phase channel, the emulsion channel and the transudation fluid channel, may further be introduced between the X layer and the front frame W, as the case requires, for the purpose of carrying out the supply of the disperse phase to the microchannels uniformly under a stabilized condition. Further, as mentioned above, lamination interfaces at which the disperse phase, the continuous phase, etc. transude, are different depending upon the manner of disposition of the respective channels, and accordingly, a notch to constitute a transudation fluid channel may be provided also in the above Y, Z or Y' layer to recover the transudation fluid and discharge it to the outside. Further, it is also possible to make a laminate-type micromixer in a form wherein these laminated units are further laminated. In such a case, a notch to constitute the disperse phase channel or the continuous phase channel may be provided also in the Z layer.

Figure 6:
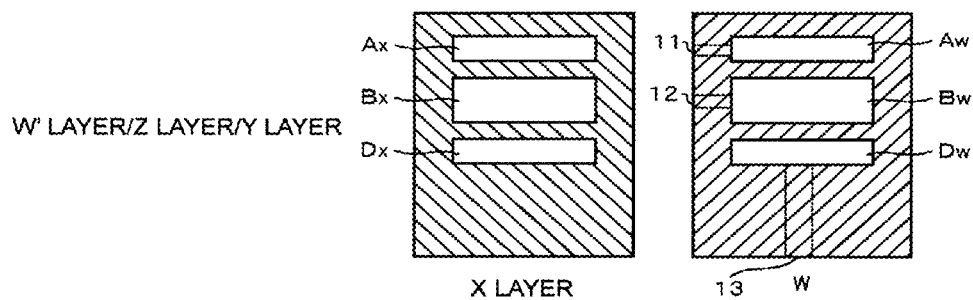
FIG. 6 is a plan view of the respective layers to constitute a microchannel structure (laminate-type micromixer) having no channel for the transudation fluid.
Figure 7:
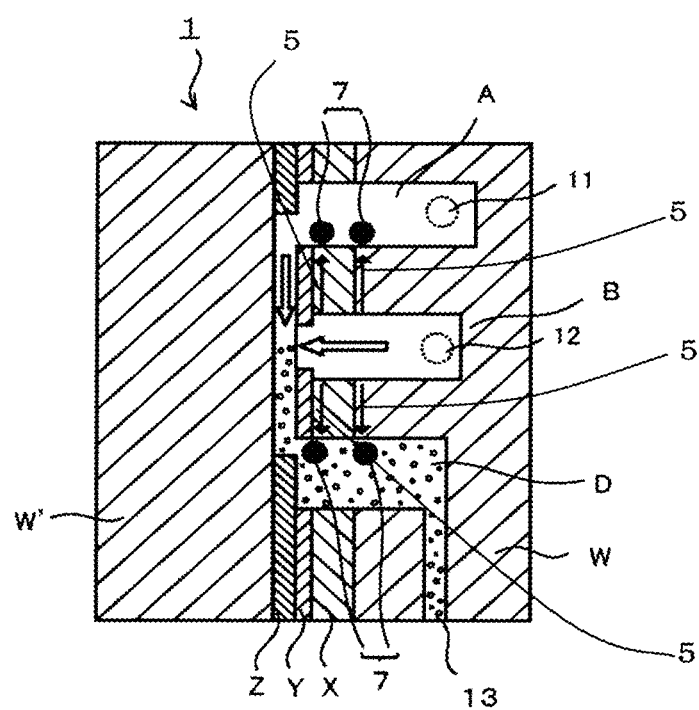
FIG. 7 is a cross-sectional view of a microchannel structure (laminate-type micromixer) having no channel for the transudation fluid.

For comparison, a microchannel structure (laminate-type micromixer) which has the same laminated structure as the laminate-type micromixer 1 in the first embodiment of the present invention but which does not have the transudation fluid channel E, will be described with reference to FIGS. 6 and 7. FIG. 6 is a plan view of the respective layers to constitute the microchannel structure (laminate-type micromixer) which does not have the transudation fluid channel. FIG. 7 is a cross-sectional view of the microchannel structure (laminate-type micromixer) which does not have the transudation fluid channel. As shown in FIG. 6, in this laminate-type micromixer, the structure of the Z and Y layers is the same as in the laminate-type micromixer 1 in the first embodiment of the present invention, but the front frame W does not have the transudation fluid-discharging hole Ew, and the X layer does not have the fourth notch Ex, and except for such differences, the structure is the same as in the laminate-type micromixer 1 in the first embodiment of the present invention.

As shown in FIG. 7, the transudation fluid 5 being the disperse phase having transuded from the disperse phase channel B reaches the continuous phase channel A or the emulsion channel D via a lamination interface, and in the emulsion channel D, it forms droplets 7 larger than the size of droplets formed through micropores. That is, in spite of the laminate-type micromixer (apparatus) for the purpose of uniform emulsification, nonuniform droplets are likely to be formed via the lamination interface. Further, large droplets 7 formed in the continuous phase channel A are likely to stay at the inlets of microchannels C or flow in the microchannels C, thus leading to an increase in the pressure for supplying the continuous phase or deterioration of the flow rate.

Such a tendency becomes distinct as the pressure of the fluid, particularly of the disperse phase, supplied to the laminate-type micromixer becomes high. Especially in a case where the fluid is passed through small holes or the cross-sectional area of microchannels is made small in order to produce a fine emulsion, or in a case where the flow rate is increased or the length of microchannels is elongated in order to increase the productivity, the pressure becomes high.

In the case of a laminate-type micromixer of a structure wherein the disperse phase is ejected into the continuous phase by utilizing the above micropores, if the problem of transudation of the disperse phase at lamination interfaces as described with reference to FIGS. 6 and 7 is taken into consideration, emulsification is possible only by ejection of the disperse phase from a side different from the side where the continuous phase is supplied to the microchannels, thus leading to a problem that it is not possible to increase the concentration of the emulsion. Whereas, in the case of utilizing the laminate-type micromixer as the microchannel structure of the present invention, the disperse phase (transudation fluid) having transuded at a lamination interface is recovered by a dedicated transudation fluid channel E and is prevented from entering into other channels, particularly into the emulsion channel, whereby emulsification by ejecting the disperse phase into the microchannels from both sides becomes possible, and it becomes possible to increase the concentration of the emulsion to a level of about twice as compared with the conventional level. Here, the concentration of the emulsion which can be accomplished varies substantially depending upon the type of the disperse phase or the continuous phase to be used, the particle size or particle size distribution of the desired emulsion, etc.

The microchannel structure of the present invention may be made to be a microchannel structure having a plurality of layers having microchannels by repeatedly laminating the above-described laminated structure.

With respect to the microchannel structure of the present invention, by the above first embodiment, an example of the laminate-type micromixer for producing an emulsion has been described wherein emulsification is carried out by mixing the disperse phase and the continuous phase as supplied fluids in the apparatus. However, the microchannel structure of the present invention is by no means limited to the above first embodiment, and it is applicable also as a laminate-type reactor such as an apparatus wherein a reaction raw material (first liquid) already mixed outside of the apparatus is reacted in the apparatus as it is brought to the reaction conditions during its flow in the apparatus, or a plurality of fluids are mixed in the apparatus to undergo a chemical reaction thereby to obtain a crude liquid of a chemically reacted product.

The microchannel structure of the present invention is useful for the production of an emulsion. Therefore, the present invention provides a method for producing an emulsion by means of the above-described microchannel structure of the present invention. Specifically, the method for producing an emulsion of the present invention is as described above for e.g. a method of supplying fluids to the microchannel structure.

The microchannel structure of the present invention is preferably applicable to the production of spherical particles having a uniform particle size. By selecting, as the disperse phase, an aqueous solution of a metal oxide precursor such as lithium silicate or sodium silicate, or an organic substance which undergoes a polymerization reaction, such as a silica sol, an alumina sol or an acrylic monomer, and, as the continuous phase, a liquid not miscible with the disperse phase, and adding to at least one of the disperse phase and the continuous phase, an emulsifier to form an emulsion, emulsification is carried out in the microchannel structure of the present invention to form an emulsion, which is subjected to the disperse phase solidification treatment such as gelation or polymerization to obtain spherical particles having a uniform particle size. In such a case, the particle size of the obtainable emulsion is preferably from 1 to 500 µm, more preferably from 1 to 100 µm.

When the microchannel structure of the present invention is used, uniform emulsification is possible even if the pressure of the supplied fluid, particularly the disperse phase, is high at a level of 0.03 MPa in the interior of the apparatus, as an operation condition, and the method of the present invention is suitably used for the production of an emulsion wherein such a condition is required. Further, in the method for producing an emulsion of the present invention, other operational conditions, such as the supplying rates of supplied fluids, the liner velocity in the microchannels, etc. of the microchannel structure of the present invention, are suitably selected or adjusted depending upon the emulsion to be produced, the continuous phase and the disperse phase to be used, etc.

According to the method for producing an emulsion of the present invention employing the microchannel structure of the present invention, even if emulsification is carried out under the above-mentioned condition of the microchannel structure of the present invention, specifically under the operational condition of the fluid-supplying pressure being high, the production of an emulsion is possible by preventing the fluid having transuded at a lamination interface from entering into other channels, whereby it is possible to produce a fine emulsion having a particle size of from 1 to 500 µm with a uniform particle size.

Further, the present invention provides a method for producing solid spherical particles by using the emulsion obtained by the above method for producing an emulsion of the present invention. Specifically, particles are taken out from the obtained emulsion by a conventional method, followed by drying, to obtain solid spherical particles having a uniform particle size. In such a case, as a raw material to be used for such a production of an emulsion, it is preferred to employ a raw material which can be solidified by a subsequent treatment. Preferred as the solid spherical particles may, for example, be silica particles, alumina particles, etc. obtained by converting the above-mentioned sodium silicate, silica sol and alumina sol to solid spherical particles. The particle size of the obtainable solid spherical particles is preferably from 1 to 500 µm, more preferably from 1 to 100 µm.

EXAMPLES

Now, the present invention will be described with reference to Examples, but, it should be understood that the present invention is by no means restricted to such Examples.

Example 1

(1) Preparation of Disperse Phase (Aqueous Sodium Silicate Solution) and Continuous Phase As a disperse phase, No. 3 sodium silicate (manufactured by AGC Si-Tech Co., Ltd.) was diluted with water to prepare an aqueous sodium silicate solution having a $SiO_2$ concentration of 24.4 mass %, a $Na_2O$ concentration of 8.14 mass % (molar ratio of $SiO_2/Na_2O$=3.09), and a specific gravity of 1.345.

As a continuous phase, one having 1 mass % of a sorbitan monooleic acid ester dissolved as a surfactant in linear saturated hydrocarbon n-nonane ($C_9H_{20}$) having a specific gravity of 0.718, was prepared.

(2) Preparation of Microchannel Structure (Laminate-Type Micromixer)

For the respective channels and respective layers, the following shapes and materials were adopted.

Channel A: channel for continuous phase
Channel B: channel for disperse phase
Channel C: processed so that after lamination, 10 channels of 3.0 mm (width)×0.05 mm (thickness of Z layer)×22 mm (length), size of notches in Z layer: 3.0 mm×30 mm) are disposed in parallel as microchannels.
Channel D: channel for emulsion having disperse phase emulsified in continuous phase
Channel E: transudation fluid channel to discharge disperse phase and continuous phase having transuded in the respective lamination interfaces to the outside and the width is 1.5 mm. In X1 layer, it passes therethrough, and in the frame, it forms a continuous channel from outside of the micromixer, with a width of 1.5 mm and a depth of 1.5 mm.

X1 layer: an ETFE film (Aflex-200N (tradename), manufactured by Asahi Glass Company, Limited) having a size of 100 mm×130 mm and a thickness of 200 μm was processed by punching to form notches having the following sizes. A first notch of 10 mm×60 mm to constitute continuous phase channel A at a position of 20 mm from the upper side, a second notch of 14 mm×60 mm to constitute a disperse phase channel at a position of 8 mm below therefrom, a third notch of 10 mm×60 mm to constitute channel D for emulsion at a position of 8 mm below therefrom, and fourth notches of 1.5 mm×60 mm to constitute transudation fluid channels E, respectively, at positions of 3.2 mm from the upper side of the second notch and 3.2 mm from the lower side, i.e. at upper and lower two positions from the second notch.

Y1 layer: SUS304 having a thickness of 0.05 mm was subjected to etching to form channels and then by excimer laser processing, as second notches to form disperse phase channels, pores having a diameter of 3.0 μm as viewed from one side, were formed with 30 μm pitches in a total number of 28,224 pores (84 pores in a horizontal direction×336 pores in a vertical direction) per 1 microchannel. They were disposed so that they were located at the center portion of the microchannels when assembled into a laminated structure. Further, in order to impart water repellency to the surface, their surface was coated with a solvent-soluble fluororesin (Cytop CTL-102AE (tradename), manufactured by Asahi Glass Company, Limited). In addition, a first notch of 10 mm×60 mm to constitute continuous phase channel A and a third notch of 10 mm×60 mm to constitute channel D for emulsion were formed.

Z1 layer: SUS304 having a thickness of 0.05 mm was subjected to etching to form notches to constitute channels and microchannels C and then in order to impart water repellency to the surface, the surface was coated with a solvent-soluble fluororesin (Cytop CTL-102AE (tradename), manufactured by Asahi Glass Company, Limited). The size and the number of notches to constitute microchannels C are as mentioned above.

The microchannels are disposed so that they overlap with both channel A and channel D when laminated with Y1 layer and the frame provided with inlets and outlets for the respective fluids. Accordingly, the microchannels of this apparatus are rectangular channels of 3.0 mm×50 μm and their length is 22 mm from the lower end of channel A to the upper end of channel D. The surface is subjected to water repellent treatment in the same manner as Y1 layer.

Front frame (W1): using an acryl plate having a thickness of 20 mm as the material, for the channel E portion, a groove having a width of 1.5 mm and a depth of 1.5 mm was prepared by cutting work. With respect to channel A, channel D and channel C portions, cutting work was carried out so that the size became the same as in X1 layer, and the depth became 10 mm. Further, the respective channels in the frame were provided with outside communication ports to supply or discharge fluids from or to the outside.

Rear frame (W2): an acrylic plate having a thickness of 20 mm was used as it was as the rear frame (W2).

<Assembling of Laminated Cell>

An assembly having front frame W1, X1 layer, Y1 layer, Z1 layer and rear frame W2 sequentially laminated in this order, was uniformly clamped by bolts.

<Emulsification>

The aqueous sodium silicate solution obtained in the above (1) was supplied as a disperse phase to channel B at a rate of 226 ml/hr by a metering pump. This corresponds to 0.8 μL/hr per one micropore.

To channel A, the above-mentioned linear saturated hydrocarbon n-nonane having the sorbitan monooleic acid ester dissolved therein, was supplied as a continuous phase at a rate of 2.18/hr. This corresponds to 218 ml/hr per 1 channel, and the linear velocity in the microchannels corresponds to 40 cm/s.

To channel E, a liquid prepared in the same manner as the continuous phase was circulated and supplied by means of 100 ml measuring cylinder at a rate of 100 ml/hr by a pump different from the pump for supplying the continuous phase, not to enter into channels A, B and D. This is designed not to let the aqueous sodium silicate solution once discharged via channel E enter again into the laminated cell, and the liquid is suctioned from the upper part of the measuring cylinder by the pump and discharged to the lower portion of the measuring cylinder.

The pressures during the operation were 0.13 MPa of the disperse phase, 0.1 MPa of the continuous phase and less than 0.01 MPa of the transudation fluid channel.

<Evaluation Method>

The emulsion prepared as described above was sampled, and with stirring, carbon dioxide gas was supplied for 15 minutes to precipitate silica particles.

Further, water was added and separated from the continuous phase, whereupon 10 ml of 20 mass % sulfuric acid was added to remove $CO_2$, followed by washing with water and drying to obtain spherical particles of silica.

By Coulter counter manufactured by Beckman Coulter, the particle size was measured by using an aperture tube having apertures of 100 μm. By this measuring method, if there are particles of at least 100 μm, the aperture tube is thereby clogged and it becomes impossible to carry out the measurement.

<Results>

Silica particles having such a uniform particle size that, by a volume-calculated particle diameter, the 50% particle diameter (hereinafter D50) was 9.2 μm, and D10/90 was 1.4, were obtained. Here, during the operation for 90 hours, the aqueous sodium silicate solution as the disperse phase discharged from channel E was 0.4 ml, and the discharged amount of the continuous phase was 5 ml.

Reference Example 1

Simulation Test

Y1 layer in Example 1 was replaced by Y2 layer having no micropores provided, and the continuous phase was supplied and circulated by a 1 L beaker to ascertain whether or not the aqueous sodium silicate solution corresponding to the disperse phase will be mixed into the continuous phase. Here, to the disperse phase in the aqueous sodium silicate solution, a back pressure of 0.3 MPa was applied by using nitrogen gas.

Upon expiration of 100 hours, the bottom of the 1 L beaker circulating the continuous phase was inspected. If the aqueous sodium silicate solution leaked into the continuous phase circulating through the microchannels, an emulsion precipitated at the bottom should be observed, but the bottom of the beaker did not change from the initial stage of the operation, and a transparent state was maintained. This means that the aqueous sodium silicate solution did not leak from the respective lamination interfaces. On the other hand, in the measuring cylinder circulating the transudation fluid, about 1.0 ml of an emulsion of sodium hydrogen silicate was observed.

Comparative Example 1

The operation and evaluation were carried out in the same manner as in Example 1 except that in Example 1, X1 layer was replaced by X2 layer having no E channel.

The obtained silica particles clogged the apertures, whereby it was not possible to measure the particle size. This means that particles larger than the particle diameter recommended by the apertures were present, and also in the observation image attached to the measuring apparatus, it was actually confirmed that the aperture portions were clogged by large particles.

Comparative Example 2

The operation was carried out in the same manner as in Reference Example 1 except that X1 layer as replaced by X2 layer having no E channel. That is, in the frame, the withdrawing line was present in a communication state. As a result, upon expiration of one day from the initiation of the operation, a small amount of an emulsion was observed at the bottom of the beaker, and it was found that the disperse phase entered into D channel. It is considered that the disperse phase leaked via the lamination interface between X2 layer and Y2 layer.

Industrial Applicability

By using the microchannel structure of the present invention, a highly reliable operation against leakage of fluids from lamination interfaces becomes possible. Further, by utilizing the microchannel structure of the present invention particularly as a laminate-type micromixer for the purpose of uniform emulsification, it becomes possible to obtain an emulsion having a uniform particle size, and solid spherical particles.

This application is a continuation of PCT Application No. PCT/JP2010/070232, filed Nov. 12, 2010, which is based upon and claims the benefit of priority from Japanese Patent Application No. 2009-258570 filed on Nov. 12, 2009. The contents of those applications are incorporated herein by reference in its entirety.

Reference Symbols

W: front frame, W': rear frame, X: X layer, Y: Y layer, Z: Z layer,
Aw, Ax, Ay: first fluid (continuous phase) channel,
Bw, Bx, By: second fluid (disperse phase) channel,
C: microchannels,
Dw, Dx, Dy: mixture (emulsion) channel,
Ew, Ex: transudation fluid channel,
1: microchannel structure (laminate-type micromixer), 2: flow of first fluid (continuous phase) in first fluid (continuous phase) channel, 3: flow of second fluid (disperse phase) in second fluid (disperse phase) channel, 4: flow of mixture (emulsion) in mixture channel, 5: transudation fluid, 6: flow of carrier fluid, 7: droplet formed by transudation fluid, 11: first fluid (continuous phase) inlet, 12: second fluid (disperse phase) inlet, 13: mixture outlet, 14: carrier fluid inlet, 15: carrier fluid outlet

What is claimed is:

1. A microchannel structure comprising:
a pair of frames;
one or more layers pressed between the pair of frames and having notches forming a plurality of channels including microchannels, the microchannels being configured such that one or more fluids supplied from at least one of the channels are mixed and/or reacted in the microchannels and discharged from the microchannels to another of the channels,
wherein at least one of the layers further comprises a notch forming a transudation fluid channel configured to discharge a transudation fluid having transuded at a lamination interface, and at least one of the pair of frames has an outside communicating hole communicated with the notch forming the transudation fluid channel such that the transudation fluid is discharged to outside from the outside communicating hole and does not enter into the channels or the microchannels.

2. The microchannel structure according to claim 1, wherein the one or more layers comprise i) a Y layer and a Z layer, or ii) the Y layer, the Z layer and a Y' layer which are sequentially laminated and pressed between the pair of frames, at least one of the pair of frames comprises fluid-supplying holes including a first fluid supplying hole and a second fluid supplying hole, a mixture/reaction product-discharging hole, and a transudation fluid-discharging hole configured such that a transudation fluid having transuded at a lamination interface is discharged to outside and does not enter into the channels or the microchannels,
each of the Y layer and the Y' layer comprises a second notch, at least one of the Y layer and the Y' layer comprises at least one of a first notch and a third notch,
the first notch is communicated with the microchannels and the first fluid-supplying hole, and configured to supply a first fluid from the first fluid-supplying hole to the microchannels at an upstream side of the microchannels formed in the Z layer,
the second notch is communicated with the microchannels and the second fluid-supplying hole and configured to supply a second fluid from the second fluid-supplying hole to a downstream side, than the first notch, of the microchannels,
the third notch is communicated with the mixture/reaction product-discharging hole and the microchannels, and configured to discharge a mixture or reaction product of the first and second fluids from a downstream side, than the second notch, of the microchannels, and
the Z layer is a layer having notches forming the microchannels configured to mix or to mix and react the first and second fluids.

3. The microchannel structure according to claim 2, wherein the one or more layers further comprise at least one of an X layer and an X' layer on at least one of the Y layer and the Y' layer such that the X layer and the X' layer do not face the Z layer, the X layer and the X' layer each comprise a second notch and a fourth notch, at least one of the X layer and the X' layer comprises at least one of a first notch and a third notch, the first notch of the X or X' layer is communicated with the first fluid-supplying hole and the first notch of the Y or Y' layer, and configured to supply the first fluid from the first fluid-supplying hole to the first notch of the Y or Y' layer, the second notch of the X or X' layer forms a channel communicated with the second fluid-supplying hole and the second notches of the Y or Y' layer, and configured to supply the second fluid to the downstream side than the first notch of the X or X' layer, the fourth notch forms a channel communicated with the transudation fluid-discharging hole formed in at least one of the pair of frames, and the third fluid notch to forms a channel communicated with the mixture/reaction product-discharging hole and the third notch of the Y or Y' layer, and configured to discharge the mixture or reaction product of the first and second fluids.

4. The microchannel structure according to claim 1, wherein at least one of the pair of frames comprises the outside communicating hole along at least a peripheral portion of the channels configured to supply the fluids.

5. The microchannel structure according to claim 1, wherein the microchannels are configured such that the fluids are mixed and an emulsion is formed.

6. The microchannel structure according to claim 5, wherein the first fluid is a continuous phase; the second fluid is a disperse phase; the second notch of each of the Y and Y' layers comprises a plurality of micropores; and the microchannels in the Z layer are configured such that the disperse phase is ejected through the micropores and supplied into the continuous phase supplied through the first notch of at least one of the Y layer and the Y' layer, and that the disperse phase and the continuous phase are emulsified in the microchannels in the Z layer.

7. The microchannel structure according to claim 6, wherein the microchannels in the Z layer comprise a plurality of rectangular microchannels; and the second notch of each of the Y and Y' layers is communicated with the rectangular microchannels and has a width corresponding to a total width of the plurality of rectangular microchannels.

8. The microchannel structure according to claim 2, wherein the transudation fluid-discharging hole in at least one of the pair of frames has a plurality of outlets communicated with the outside; and the outlets are positioned such that a carrier fluid introduced from at least one of the outlets to the transudation fluid-discharging hole passes through the transudation fluid-discharging hole and is discharged from the rest of the outlets to the outside, and that the transudation fluid mixed with the carrier fluid is discharged to the outside.

9. The microchannel structure according to claim 6, wherein the disperse phase is an aqueous silicate solution.

10. The microchannel structure according to claim 1, wherein the channels are operable under a condition that the fluids supplied in the channels have a maximum pressure of at least 0.03 MPa.

11. The microchannel structure according to claim 2, wherein the transudation fluid-discharging hole is formed such that three sides of the second fluid supplying hole are enclosed by the transudation fluid-discharging hole.

* * * * *